United States Patent
Tomozawa et al.

(10) Patent No.: US 9,481,368 B2
(45) Date of Patent: Nov. 1, 2016

(54) PARK EXIT ASSIST SYSTEM AND PARK EXIT ASSIST METHOD

(71) Applicants: AISIN SEIKI KABUSHIKI KAISHA, Kariya-shi, Aichi-ken (JP); TOYOTA JIDOSHA KABUSHIKI KAISHA, Aichi-ken (JP)

(72) Inventors: Motokatsu Tomozawa, Nagoya (JP); Masaya Kato, Toyokawa (JP); Hiroyuki Tachibana, Okazaki (JP); Tomohisa Yamashita, Toyohashi (JP); Shogi Fukukawa, Nagoya (JP); Takatomo Asai, Nagoya (JP); Motonari Obayashi, Nagakute (JP); Hironobu Ishijima, Toyota (JP)

(73) Assignees: AISIN SEIKI KABUSHIKI KAISHA, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/850,163

(22) Filed: Sep. 10, 2015

(65) Prior Publication Data
US 2016/0075331 A1    Mar. 17, 2016

(30) Foreign Application Priority Data
Sep. 12, 2014 (JP) .................. 2014-186778

(51) Int. Cl.
| B60W 30/095 | (2012.01) |
| B60W 10/18 | (2012.01) |
| B60W 10/20 | (2006.01) |

(Continued)

(52) U.S. Cl.
CPC .......... *B60W 30/0956* (2013.01); *B60W 10/18* (2013.01); *B60W 10/20* (2013.01); *B60W 30/06* (2013.01); *B62D 15/028* (2013.01); *B62D 15/0285* (2013.01); *B60W 2550/00* (2013.01); *B60W 2710/18* (2013.01); *B60W 2710/20* (2013.01)

(58) Field of Classification Search
CPC .............. B60W 10/18; B60W 10/20; B60W 2550/00; B60W 2710/18; B60W 2710/20; B60W 30/0956; B62D 15/028
USPC ...................................... 701/36, 41
See application file for complete search history.

(56) References Cited

U.S. PATENT DOCUMENTS

| 8,560,175 B2 * | 10/2013 | Bammert | B62D 15/0285 701/301 |
| 8,825,221 B2 * | 9/2014 | Huger | B62D 15/027 701/1 |

(Continued)

FOREIGN PATENT DOCUMENTS

| JP | 4-356277 A | 12/1992 |
| JP | 2011518706 A | 6/2011 |

*Primary Examiner* — Tyler J Lee
(74) *Attorney, Agent, or Firm* — Sughrue Mion, PLLC

(57) ABSTRACT

A park exit assist system includes an electronic control unit. The electronic control unit is configured to, at a time of assisting in moving a vehicle parallel parked in a parking area out of the parking area, set an imaginary line at a boundary at a predetermined position on a side in a direction, which is opposite to a direction in which the vehicle is moved out of the parking area, on the basis of a position of the vehicle at a start of assisting in moving the vehicle out of the parking area, set an area beyond the imaginary line for a no-entry area, and execute control for assisting in moving the vehicle out of the parking area such that the vehicle does not enter the no-entry area.

19 Claims, 12 Drawing Sheets

(51) Int. Cl.
*B62D 15/02* (2006.01)
*B60W 30/06* (2006.01)

(56) References Cited

U.S. PATENT DOCUMENTS

| | | | |
|---|---|---|---|
| 9,283,960 B1* | 3/2016 | Lavoie | B60W 30/06 |
| 9,298,993 B2* | 3/2016 | Fan | G06K 9/00812 |
| 2010/0070139 A1* | 3/2010 | Ohshima | B60R 1/00 |
| | | | 701/42 |
| 2010/0271236 A1* | 10/2010 | Moshchuk | B62D 15/0285 |
| | | | 340/932.2 |
| 2011/0054739 A1* | 3/2011 | Bammert | B62D 15/0285 |
| | | | 701/41 |
| 2013/0120161 A1* | 5/2013 | Wakabayashi | B62D 15/0295 |
| | | | 340/932.2 |
| 2015/0344028 A1* | 12/2015 | Gieseke | B60W 30/00 |
| | | | 701/1 |

* cited by examiner

PARK EXIT ASSIST SYSTEM AND PARK EXIT ASSIST METHOD

INCORPORATION BY REFERENCE

The disclosure of Japanese Patent Application No. 2014-186778 filed on Sep. 12, 2014 including the specification, drawings and abstract is incorporated herein by reference in its entirety.

BACKGROUND OF THE INVENTION

1. Field of the Invention

The invention relates to a park exit assist system and a park exit assist method.

2. Description of Related Art

As a technique for assisting in moving a vehicle parked in a parking area out of the parking area, there is generally known a technique for assisting in moving a vehicle out of a parking area such that the vehicle does not collide with a surrounding obstacle (for example, Japanese Patent Application Publication No. 4-356277 (JP 4-356277 A)).

However, in the above existing technique, when there is a curb, a ditch, or the like, around a ground surface on a side opposite to a side to which the vehicle moves out of the parking are, it is presumable that the vehicle may not be able to avoid the curb, ditch, or the like, at the time when the vehicle exits. In order to detect such a curb, a ditch, or the like, around a ground surface, it is required to additionally provide a new sensor in a vehicle, so the equipment of the vehicle increases.

Therefore, when park exit assist is performed, it is desired to move the vehicle out of a parking area while reliably avoiding an obstacle without increasing the equipment of the vehicle.

SUMMARY OF THE INVENTION

An aspect of the invention provides a park exit assist system. The park exit assist system includes an electronic control unit. The electronic control unit is configured to, at a time of assisting in moving a vehicle parallel parked in a parking area out of the parking area, set an imaginary line at a boundary at a predetermined position on a side in a direction, which is opposite to a direction in which the vehicle is moved out of the parking area, on the basis of a position of the vehicle at a start of assisting in moving the vehicle out of the parking area, set an area beyond the imaginary line for a no-entry area, and execute control for assisting in moving the vehicle out of the parking area such that the vehicle does not enter the no-entry area.

Another aspect of the invention provides a park exit assist method. The park exit assist method includes: at a time of assisting in moving a vehicle parallel parked in a parking area out of the parking area, setting an imaginary line at a boundary at a predetermined position on a side in a direction, which is opposite to a direction in which the vehicle is moved out of the parking area, on the basis of a position of the vehicle at a start of assisting in moving the vehicle out of the parking area; setting an area beyond the imaginary line for a no-entry area; and executing control for assisting in moving the vehicle out of the parking area such that the vehicle does not enter the no-entry area.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is an exemplary perspective view of a vehicle according to an embodiment in a state where part of a cabin is seen through;

DETAILED DESCRIPTION OF EMBODIMENTS

Hereinafter, an exemplary embodiment of the invention will be described. The configuration of the embodiment described below, and the operation, results and advantageous effects obtained from the configuration are illustrative of the invention. The invention may be implemented by a configuration other than the configuration that will be described in the following embodiment, and may obtain at least one of various advantageous effects based on a basic configuration or secondary advantageous effects.

A vehicle 1 according to the present embodiment may be, for example, an automobile that uses an internal combustion engine (not shown) as a drive source, that is, an internal combustion engine automobile, may be an automobile that uses an electric motor (not shown) as a drive source, that is, an electric automobile, a fuel-cell automobile, or the like, may be a hybrid automobile that uses both the internal combustion engine and the electric motor as drive sources, or may be an automobile including another drive source. Various transmissions may be mounted on the vehicle 1. Various devices, such as system and components, required to drive an internal combustion engine or an electric motor may be mounted on the vehicle 1. The system, number, layout, and the like, of a device related to driving of wheels 3 in the vehicle 1 may be variously set.

Figure 1:
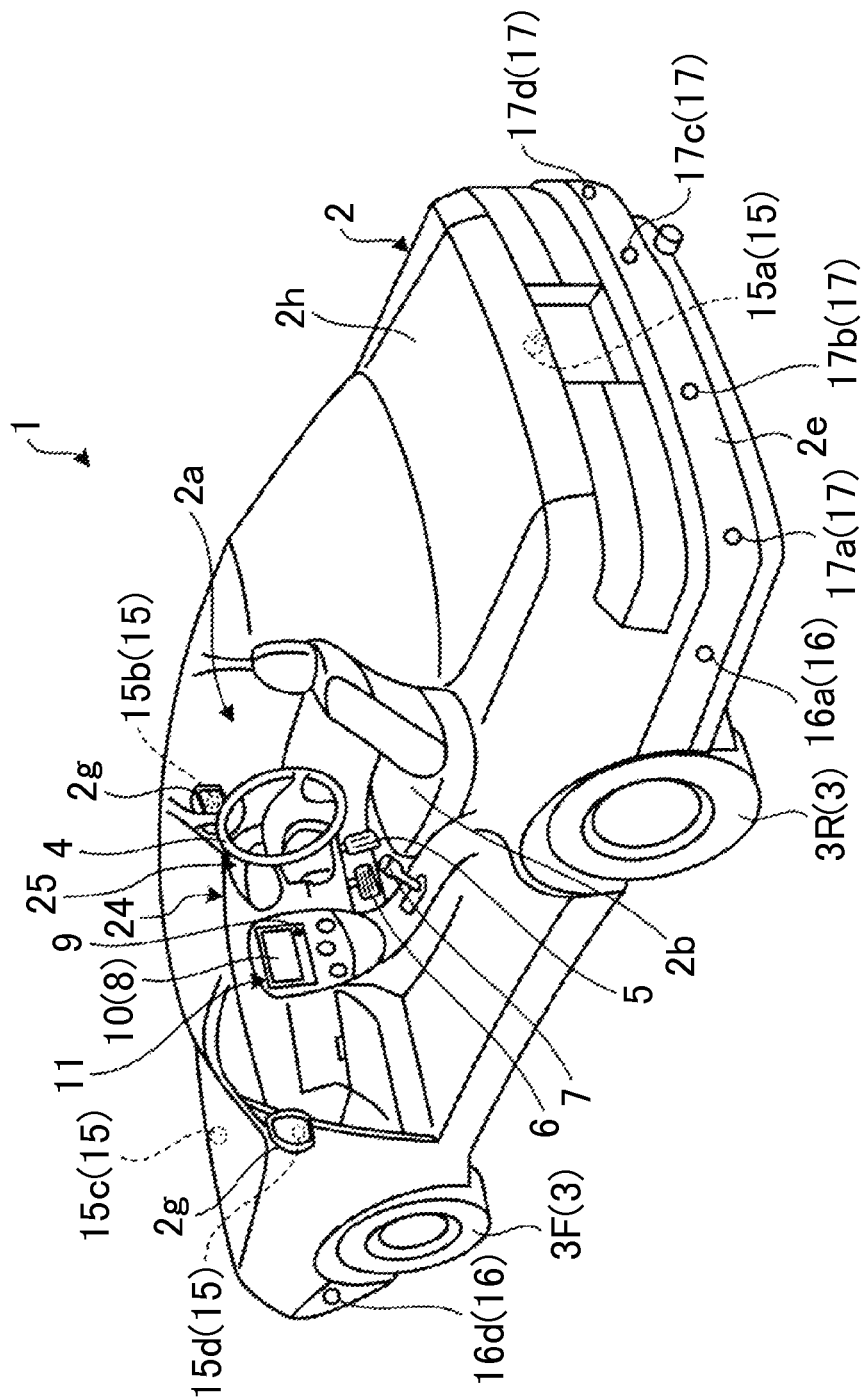
Figure 2:
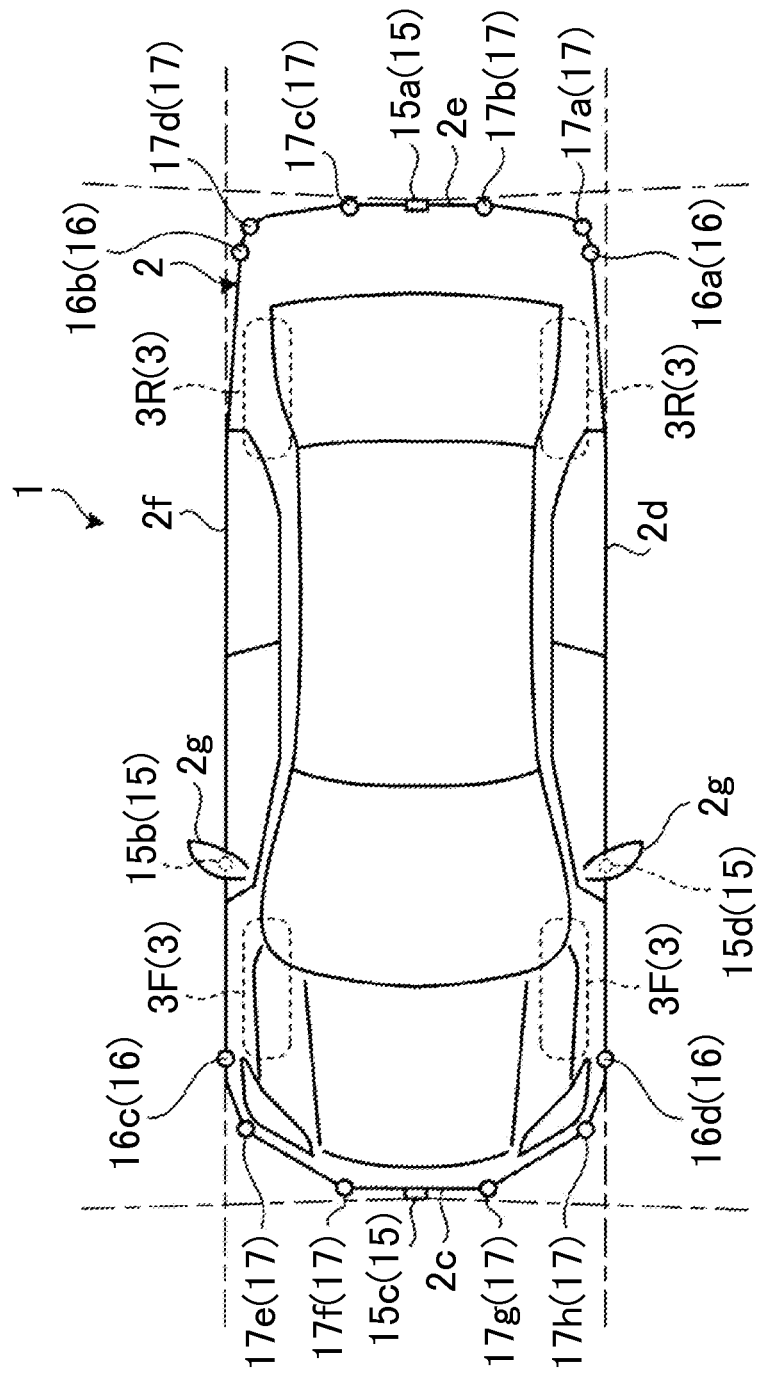
FIG. 2 is an exemplary plan view (bird's-eye view) of the vehicle according to the embodiment.

FIG. 1 is an exemplary perspective view of a vehicle according to the embodiment in a state where part of a cabin is seen through. FIG. 2 is an exemplary plan view (bird's-eye view) of the vehicle according to the embodiment. As illustrated in FIG. 1, a vehicle body 2 constitutes a cabin 2a in which an occupant (not shown) is seated. A steering unit 4, an accelerator operation unit 5, a brake operation unit 6, a shift operation unit 7, and the like, are provided near a seat 2*b* of a driver as an occupant inside the cabin 2*a*. The steering unit 4 is, for example, a steering wheel projecting from a dashboard 24. The accelerator operation unit 5 is, for example, an accelerator pedal located near driver's foot. The brake operation unit 6 is, for example, a brake pedal located near driver's foot. The shift operation unit 7 is, for example, a shift lever projecting from a center console. The steering unit 4, the accelerator operation unit 5, the brake operation unit 6, the shift operation unit 7, and the like, are not limited to these components.

A display device 8 and an audio output device 9 are provided inside the cabin 2*a*. The display device 8 serves as a display output unit. The audio output device 9 serves as an audio output unit. The display device 8 is, for example, a liquid crystal display (LCD), an organic electroluminescent display (OELD), or the like. The audio output device 9 is, for example, a speaker. The display device 8 is, for example, covered with a translucent operation input unit 10, such as a touch panel. An occupant is allowed to visually recognize an image that is displayed on the display screen of the display device 8 via the operation input unit 10. An occupant is allowed to perform an input operation by operating the operation input unit 10 through touching, pressing or moving the operation input unit 10 with a finger, or the like, at a position corresponding to an image that is displayed on the display screen of the display device 8. These display device 8, audio output device 9, operation input unit 10, and the like, are, for example, provided in a monitor device 11 located at the center in the vehicle width direction, that is, transverse direction, of the dashboard 24. The monitor device 11 may have an operation input unit (not shown), such as a switch, a dial, a joystick and a push button. An audio output device (not shown) may be provided at another position inside the cabin 2*a*, different from the monitor device 11. Audio may be output from the audio output device 9 of the monitor device 11 and another audio output device. The monitor device 11 is, for example, shared with a navigation system or an audio system. A display device 12 different from the display device 8 is provided inside the cabin 2*a*.

Figure 3:
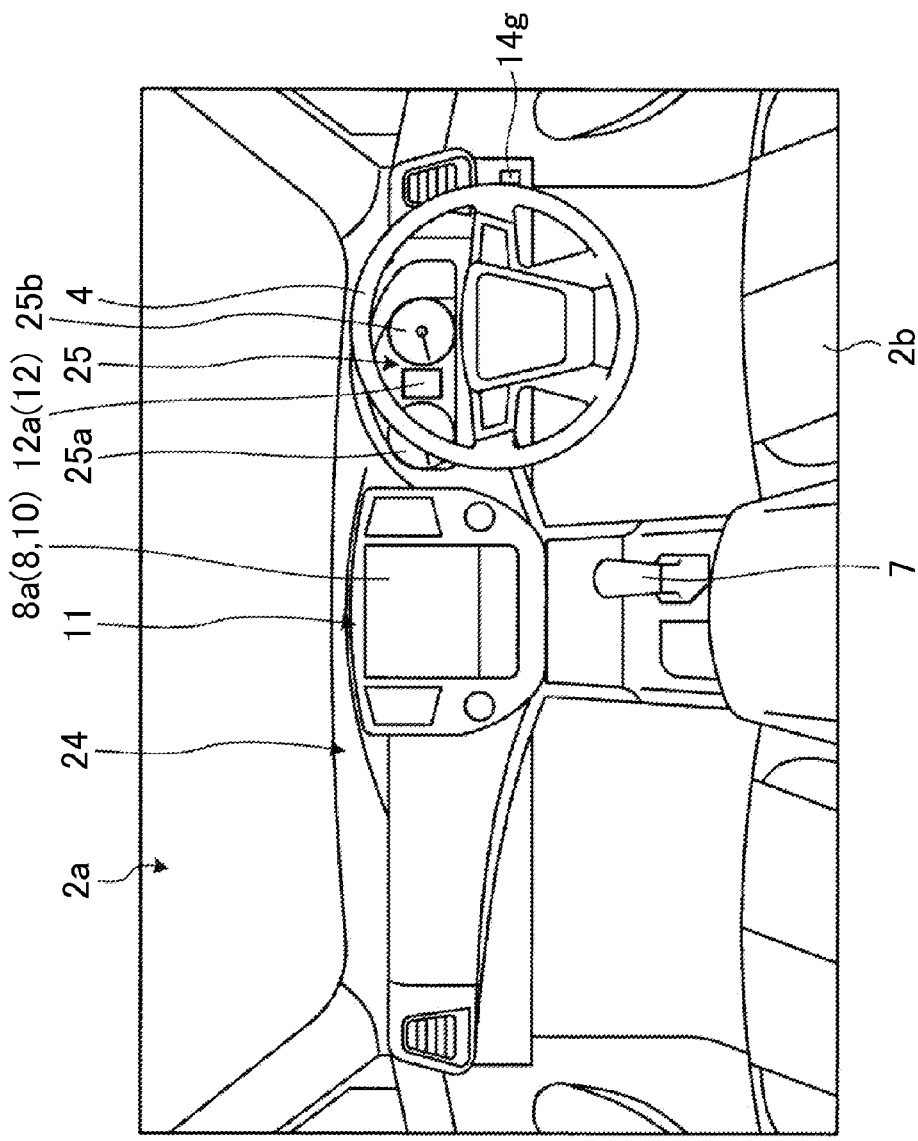
FIG. 3 is a view of an example of a dashboard of the vehicle according to the embodiment when viewed from a rear side in a vehicle longitudinal direction.

FIG. 3 is a view of an example of a dashboard of the vehicle according to the embodiment when viewed from a rear side in a vehicle longitudinal direction. As shown in FIG. 3, the display device 12 is, for example, provided in an instrument panel unit 25 in the dashboard 24, and is located at substantially the center of the instrument panel unit 25 between a speed indicating unit 25*a* and a rotation speed indicating unit 25*b*. The size of the screen 12*a* of the display device 12 is smaller than the size of the screen 8*a* of the display device 8. An image that shows information for assisting in parking the vehicle 1 may be mainly displayed on the display device 12. The amount of information that is displayed on the display device 12 may be smaller than the amount of information that is displayed on the display device 8. The display device 12 is, for example, an LCD, an OELD, or the like. Information that is displayed on the display device 12 may be displayed on the display device 8.

As illustrated in FIG. 1 and FIG. 2, the vehicle 1 is, for example a four-wheel vehicle, and includes two right and left front wheels 3F and two right and left rear wheels 3R. Each of these four wheels 3 may be configured to be steerable.

Figure 4:
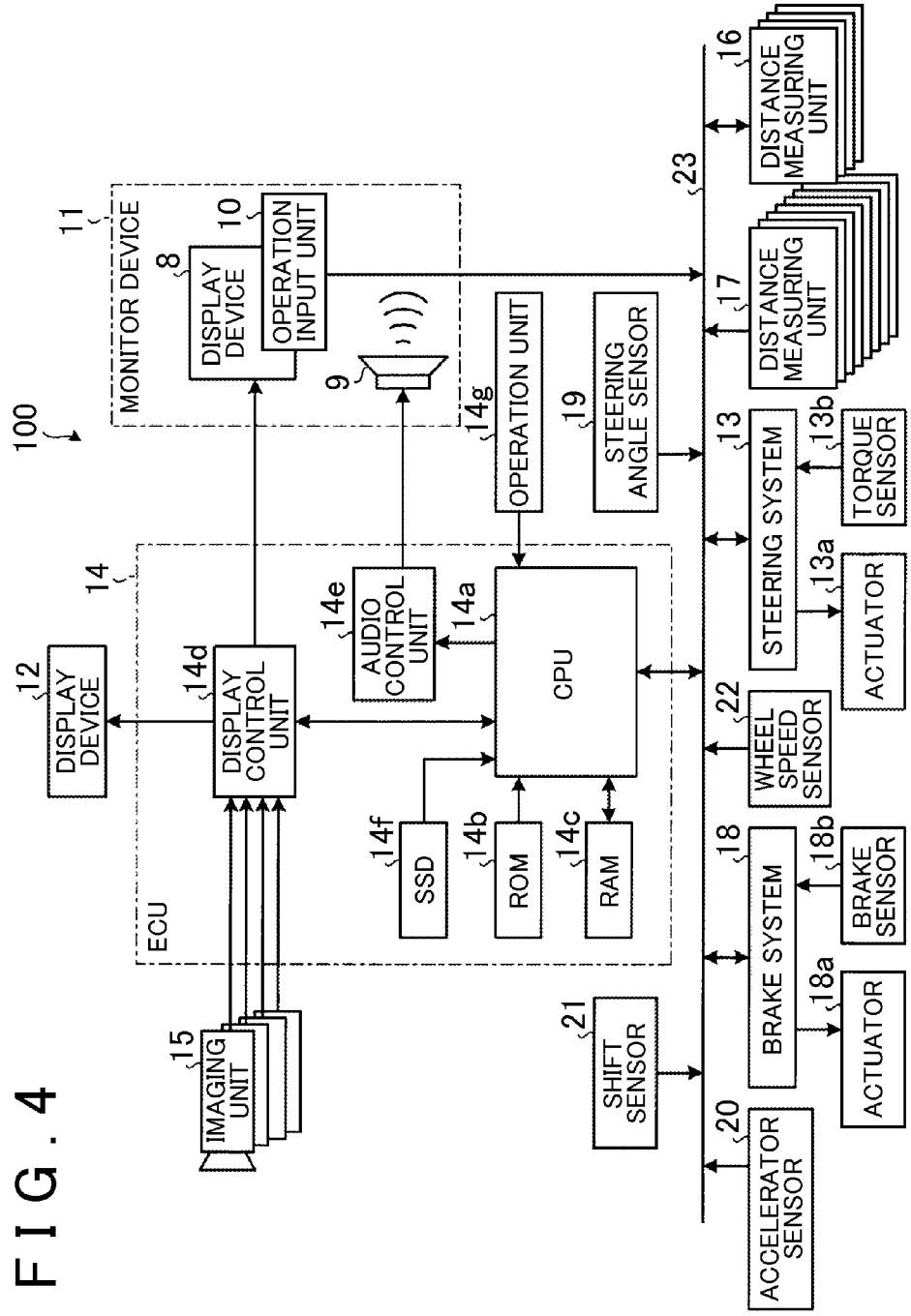
FIG. 4 is an exemplary block diagram of the configuration of a park exit assist system according to the embodiment.

FIG. 4 is an exemplary block diagram of the configuration of a park exit assist system according to the embodiment. As illustrated in FIG. 4, the vehicle 1 includes a steering system that steers at least two of the wheels 3. The steering system 13 includes an actuator 13*a* and a torque sensor 13*b*. The steering system 13 is electrically controlled by an electronic control unit (ECU) 14, or the like, to actuate the actuator 13*a*. The steering system 13 is, for example, an electric power steering system, a steer-by-wire (SBW) system, or the like. The steering system 13 adds torque, that is, assist torque, to the steering unit 4 with the use of the actuator 13*a* to compensate for steering force or steers the wheels 3 with the use of the actuator 13*a*. In this case, the actuator 13*a* may steer one of the wheels 3 or may steer a plurality of the wheels 3. The torque sensor 13*b*, for example, detects a torque that is applied to the steering unit 4 by a driver.

As illustrated in FIG. 2, four imaging units 15*a* to 15*d* are provided on the vehicle body 2 as a plurality of imaging units 15. Each of the imaging units 15 is, for example, a digital camera that incorporates an imaging device, such as a charge coupled device (CCD) and a CMOS image sensor (CIS). Each of the imaging units 15 is able to output moving image data at a predetermined frame rate. Each of the imaging units 15 has a wide angle lens or a fisheye lens, and is able to capture an image in, for example, the range of 140° to the range of 190° in the horizontal direction. The optical axis of each of the imaging units 15 is set so as to be oriented obliquely downward. Thus, each of the imaging units 15 sequentially captures a road surface on which the vehicle 1 is allowed to move and an outside environment around the vehicle body 2, including an area in which the vehicle 1 is allowed to be parked, and outputs the captured image as captured image data.

The imaging unit 15*a* is located at a rear end 2*e* of the vehicle body 2, and is provided at a lower wall portion of a door 2*h* of a rear boot. The imaging unit 15*b* is located at a right-side end 2*f* of the vehicle body 2, and is provided at a right-side door mirror 2*g*. The imaging unit 15*c* is located at the front of the vehicle body 2, that is, a front end 2*c* in the vehicle longitudinal direction, and is provided at a front bumper, or the like. The imaging unit 15*d* is located at the left side of the vehicle body 2, that is, a left-side end 2*d* in the vehicle width direction, and is provided at a door mirror 2*g* that serves as a left-side projecting portion. The ECU 14 is able to generate an image having a wider viewing angle or generate an imaginary bird's-eye image of the vehicle 1 from above by executing operation processing and image processing on the basis of the image data obtained by the imaging units 15. A bird's-eye image may be referred to as plan image.

The ECU 14 identifies partition lines, or the like, on a road surface around the vehicle 1 from the images of the imaging units 15, and detects (extracts) parking spaces indicated by the partition lines, or the like.

As illustrated in FIG. 1 and FIG. 2, for example, four distance measuring units 16*a* to 16*d* and eight distance measuring units 17*a* to 17*h* are provided on the vehicle body 2 as a plurality of distance measuring units 16, 17. Each of the distance measuring units 16, 17 is, for example, a sonar that emits ultrasonic wave and captures the reflected wave. The sonar may also be referred to as a sonar sensor or an ultrasonic detector. The ECU 14 is able to detect whether there is an object, such as an obstacle, located around the vehicle 1 or measure a distance to the object on the basis of the detected results of the distance measuring units 16, 17. That is, each of the distance measuring units 16, 17 is an example of a detection unit that detects an object. Each of the distance measuring units 17 may be, for example, used to detect an object at a relatively close distance. Each of the distance measuring units 16 may be, for example, used to detect an object at a relatively long distance, which is distant from an object that each of the distance measuring units 17 detects. The distance measuring units 17 may be, for example, used to detect an object ahead of or behind the vehicle 1. The distance measuring units 16 may be, for example, used to detect an object to the side of the vehicle 1.

As illustrated in FIG. 4, in a park exit assist system 100, in addition to the ECU 14, the monitor device 11, the steering system 13, the distance measuring units 16, 17, and the like, a brake system 18, a steering angle sensor 19, an accelerator sensor 20, a shift sensor 21, a wheel speed sensor 22, and the like, are electrically connected to one another via an in-vehicle network 23 that serves as an electric communication line. The in-vehicle network 23 is, for example, provided as a controller area network (CAN). The ECU 14 is able to control the steering system 13, the brake system 18, and the like, by transmitting control signals through the in-vehicle network 23. The ECU 14 is able to receive detected results of the torque sensor 13b, a brake sensor 18b, the steering angle sensor 19, the distance measuring units 16, the distance measuring units 17, the accelerator sensor 20, the shift sensor 21, the wheel speed sensor 22, and the like, and operation signals of the operation input unit 10, and the like, via the in-vehicle network 23.

The ECU 14, for example, includes a central processing unit (CPU) 14a, a read only memory (ROM) 14b, a random access memory (RAM) 14c, a display control unit 14d, an audio control unit 14e, a solid state drive or flash memory (SSD) 14f, and the like. The CPU 14a is, for example, able to execute various operation processing and control, such as image processing related to images that are displayed on the display devices 8, 12, determination of a moving target position of the vehicle 1, computation of a moving path of the vehicle 1, determination as to whether there is an interference with an object, automatic control over the vehicle 1, and cancellation of automatic control. The CPU 14a is able to read a program installed and stored in a nonvolatile storage device, such as the ROM 14b, and execute operation processing in accordance with the program. The RAM 14c temporarily stores various pieces of data that are used for computation in the CPU 14a. The display control unit 14d mainly executes image processing by the use of image data obtained by the imaging units 15, synthesis of image data that are displayed on the display device 8, and the like, within the operation processing in the ECU 14. The audio control unit 14e mainly processes audio data that are output from the audio output device 9 within the operation processing in the ECU 14. The SSD 14f is a rewritable nonvolatile storage unit, and is able to store data even when the power of the ECU 14 is turned off. The CPU 14a, the ROM 14b, the RAM 14c, and the like, may be integrated within the same package. The ECU 14 may be formed of another logical operation processor, such as a digital signal processor (DSP), a logical circuit, or the like, instead of the CPU 14a. A hard disk drive (HDD) may be provided instead of the SSD 14f. The SSD 14f or the HDD may be provided separately from the ECU 14.

The brake system 18 is, for example, an anti-lock brake system (ABS) that prevents the brake from locking up the wheels, a side slip prevention device (electronic stability control (ESC)) that prevents a side slip of the vehicle 1 during cornering, an electric brake system that enhances brake force (performs brake assist), or a brake-by-wire (BBW). The brake system 18 imparts braking force to the wheels 3 and, by extension, the vehicle 1, via the actuator 18a. The brake system 18 is able to execute various controls by detecting locking up of the wheels by the brake, a spin of the wheels 3, a sign of a side slip, and the like, from, for example, a rotation difference between the right and left wheels 3. The brake sensor 18b is, for example, a sensor that detects the position of a movable unit of the brake operation unit 6. The brake sensor 18b is, for example, a sensor that detects the position of the brake pedal that serves as the movable unit of the brake operation unit 6. The brake sensor 18b includes a displacement sensor.

The steering angle sensor 19 is, for example, a sensor that detects a steering amount of the steering unit 4, such as the steering wheel. The steering angle sensor 19 is, for example, provided by using a Hall element, or the like. The ECU 14 acquires a driver's steering amount of the steering unit 4, a steering amount of each wheel 3 during automatic steering, or the like, from the steering angle sensor 19, and executes various controls. The steering angle sensor 19 detects a rotation angle of a rotating portion included in the steering unit 4. The steering angle sensor 19 is an example of an angle sensor.

The accelerator sensor 20 is, for example, a sensor that detects the position of a movable unit of the accelerator operation unit 5. The accelerator sensor 20 is able to detect the position of the accelerator pedal that serves as the movable unit. The accelerator sensor 20 includes a displacement sensor.

The shift sensor 21 is, for example, a sensor that detects the position of a movable unit of the shift operation unit 7. The shift sensor 21 is able to detect the position of a lever, an arm, a button, or the like, that serves as the movable unit of the shift operation unit 7. The shift sensor 21 may include a displacement sensor or may be provided as a switch.

The wheel speed sensor 22 is a sensor that detects a rotation amount or rotation speed of each wheel 3 per unit time. The wheel speed sensor 22 outputs a wheel speed pulse number, indicating the detected rotation speed, as a sensor value. The wheel speed sensor 22 may be, for example, provided by using a Hall element, or the like. The ECU 14 computes a moving amount, and the like, of the vehicle 1 on the basis of the sensor value acquired from the wheel speed sensor 22, and executes various controls. There is a case where the wheel speed sensor 22 is provided in the brake system 18. In this case, the ECU 14 acquires the detected result of the wheel speed sensor 22 via the brake system 18.

The configurations, arrangement, electrical connection modes, and the like, of the above-described various sensors and actuators are illustrative, and may be variously set (changed).

Figure 5:
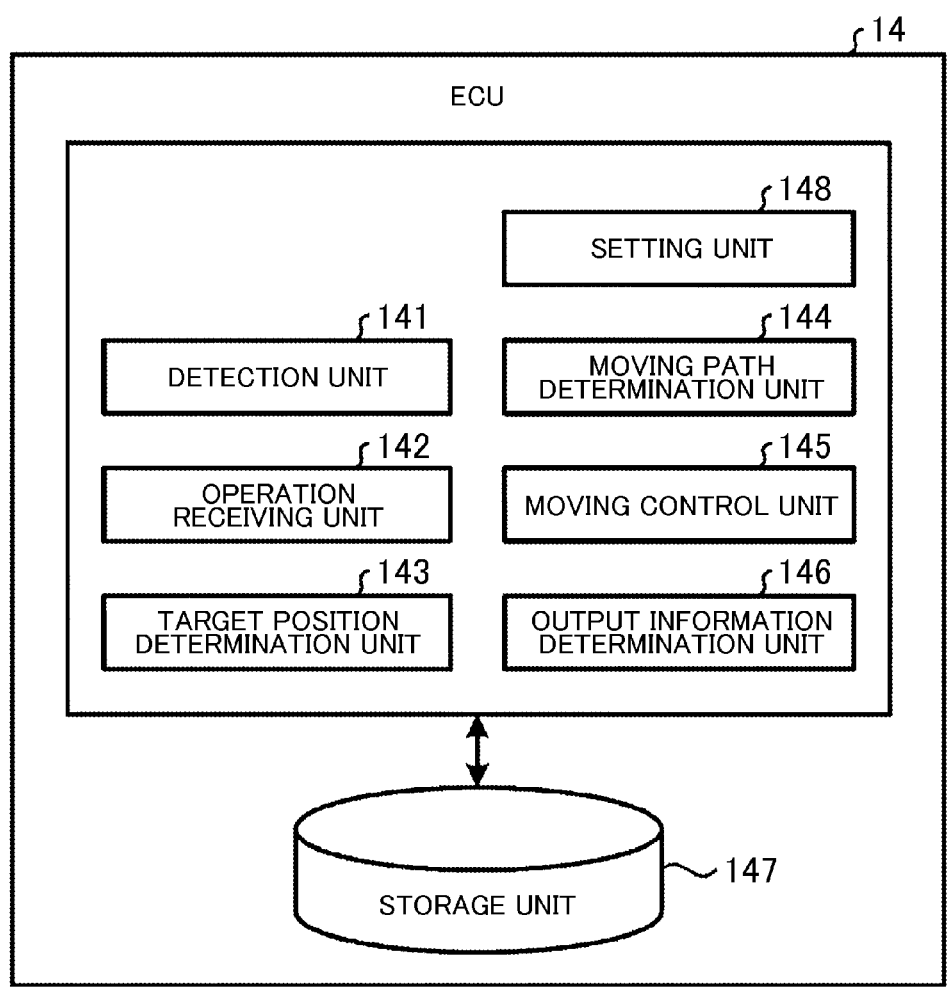
FIG. 5 is an exemplary block diagram of the configuration of an ECU of the park exit assist system according to the embodiment.

In the present embodiment, the ECU 14 implements at least part of the function of a park exit assist system by cooperation between hardware and software (control program). FIG. 5 is a functional configuration block diagram of the ECU. As shown in FIG. 5, the ECU 14 functions as a detection unit 141, an operation receiving unit 142, a target position determination unit 143, a moving path determination unit 144, a moving control unit 145, an output information determination unit 146, a setting unit 148 and a storage unit 147.

In the above configuration, the detection unit 141 detects an obstacle, such as another vehicle and a pole, a frame line, such as a parking space line, and the like. The operation receiving unit 142 acquires an operation signal that is input through operation of an operation unit 14g. The operation unit 14g is, for example, formed of a push button, a switch, or the like, and outputs an operation signal. The target position determination unit 143 determines a moving target position of the vehicle 1. When parking assist control is executed, the moving target position is a parking target position. When park exit assist control is executed, the moving target position is a position after the vehicle is moved out of a parking area, that is, a park exit target position. The moving path determination unit 144 determines a moving path of the vehicle 1 to the moving target position. The moving control unit 145 (control unit) controls the portions of the vehicle 1 such that the vehicle 1 moves to the moving target position along the moving path. The moving control unit 145 executes both parking assist control and park exit assist control. In the present embodiment, park exit assist control is described. Park exit assist may be included in parking assist. The output information determination unit 146 determines information that is output through the display device 12, the display device 8, the audio output device 9, or the like, an output mode of the information, and the like. The setting unit 148 sets a no-entry area. The details of the no-entry area will be described later. The storage unit 147 stores data that are used in computation in the ECU 14 or data calculated in computation in the ECU 14.

Figure 6:
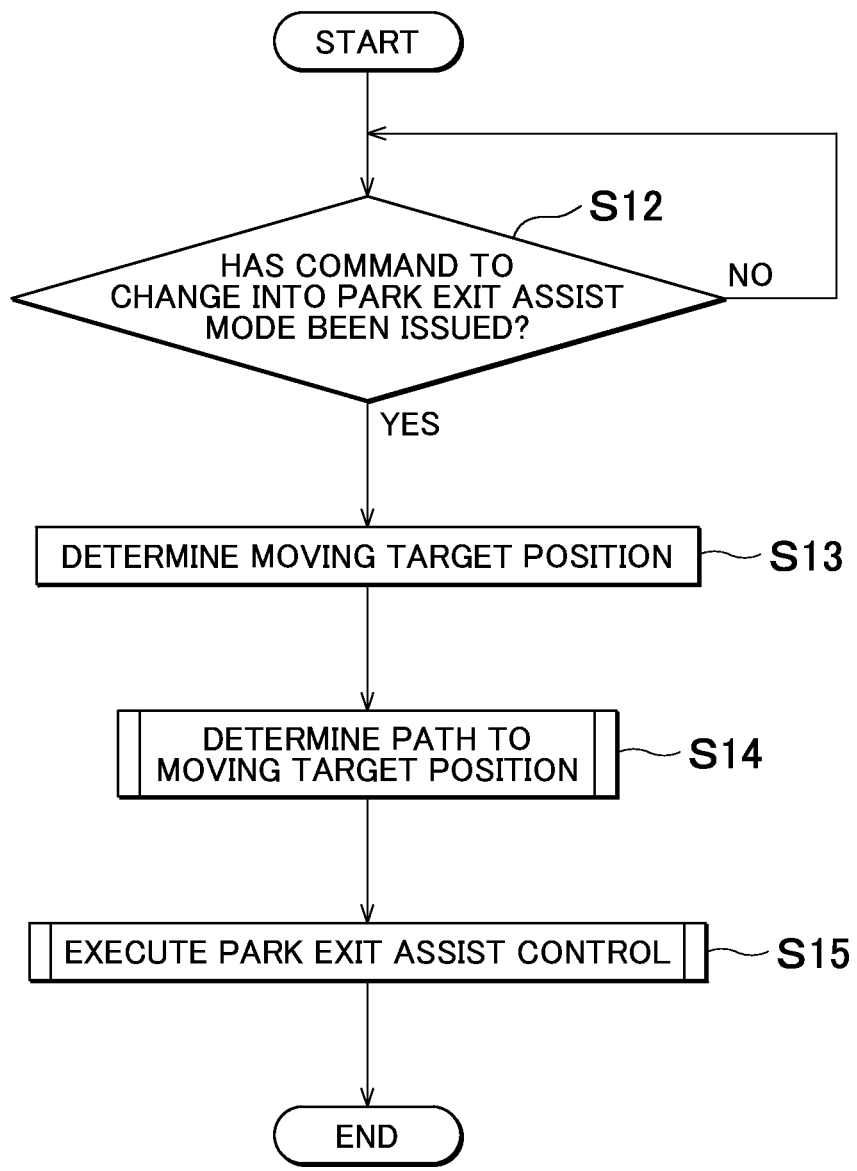
FIG. 6 is a flowchart that shows the procedure of a schematic process according to the embodiment.

Next, the operation of the embodiment will be described. FIG. 6 is a flowchart of a schematic process according to the embodiment. In FIG. 6, the case where the vehicle 1 parked in an available parking area is moved out of the available parking area will be described. Initially, the ECU 14 functions as the operation receiving unit 142, and determines whether a command to change into a park exit assist mode has been issued via the operation unit 14g (step S12). When it is determined in step S12 that a command to change into the park exit assist mode has not been issued via the operation unit 14g yet (No in step S12), the process enters a standby state. When it is determined in step S12 that a command to change into the park exit assist mode has been issued via the operation unit 14g (Yes in step S12), the ECU 14 functions as the target position determination unit 143, and determines a moving target position (park exit target position) of the vehicle 1 (step S13). Subsequently, the ECU 14 functions as the moving path determination unit 144, and determines a moving path of the vehicle 1 to the moving target position (step S14).

Figure 7:
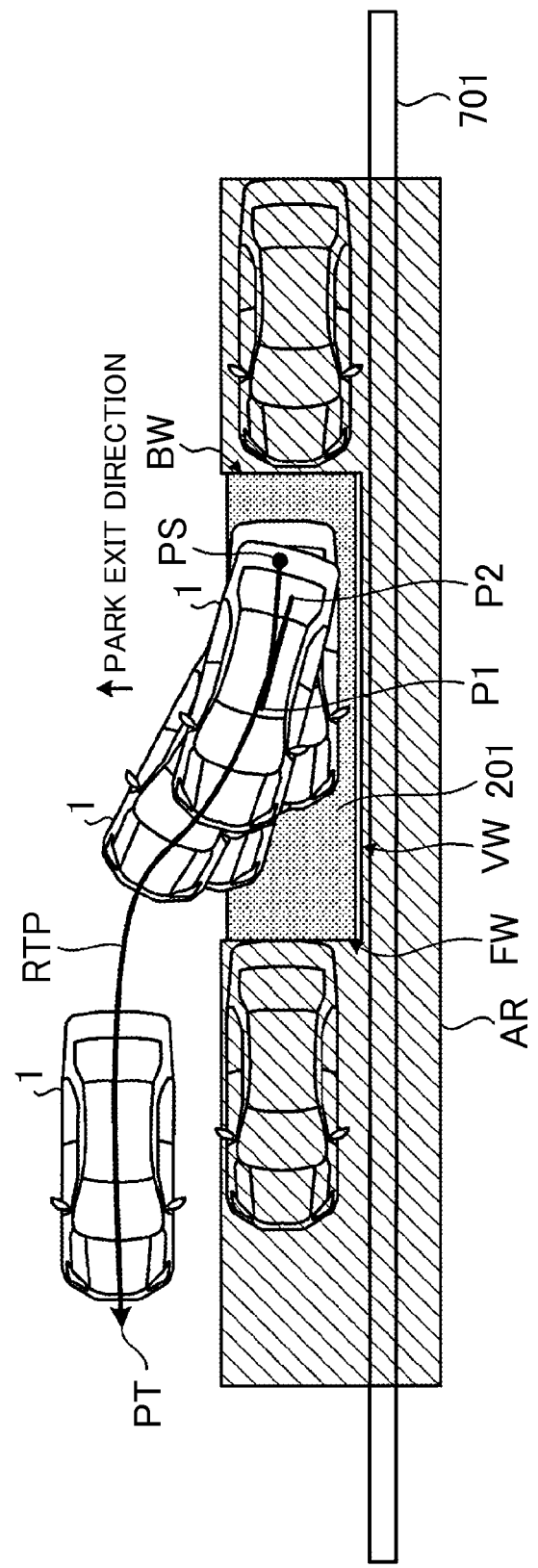
FIG. 7 is a view that illustrates an example of a set moving path according to the embodiment.

FIG. 7 is a view that illustrates an example of a set moving path. The case of the moving path in which switching positions of the vehicle 1 at which the steering wheel that serves as the steering unit 4 is turned are two positions P1, P2 will be described with reference to FIG. 7. The switching positions P1, P2 are also at the positions at which a moving direction of the vehicle 1 is changed between a forward direction and a reverse direction.

The moving path RTP shown in FIG. 7 advances from an initial position PS at the start of a park exit assist control process (that is, a parking position within an available parking area) for the vehicle 1 toward the switching position P1 by turning the steering wheel rightward by a predetermined amount. In the moving path RTP, a driver depresses the brake pedal that serves as the brake operation unit 6 at the switching position P1 to stop the vehicle 1, changes the gear into reverse, and reverses the vehicle 1 toward the switching position P2 while slightly turning the steering wheel leftward. In the moving path RTP, the driver depresses the brake pedal at the switching position P2 to stop the vehicle 1, changes the gear into forward, moves the vehicle 1 out of the parking area while turning the steering wheel rightward, and, after moving the vehicle out of the parking area, returns the steering wheel to a neutral position by turning the steering wheel leftward to move the vehicle 1 toward a park exit target position PT. In FIG. 7, the sign 701 denotes a curb, the sign 201 denotes the available parking area, the sign AR denotes the no-entry area.

Figure 8:
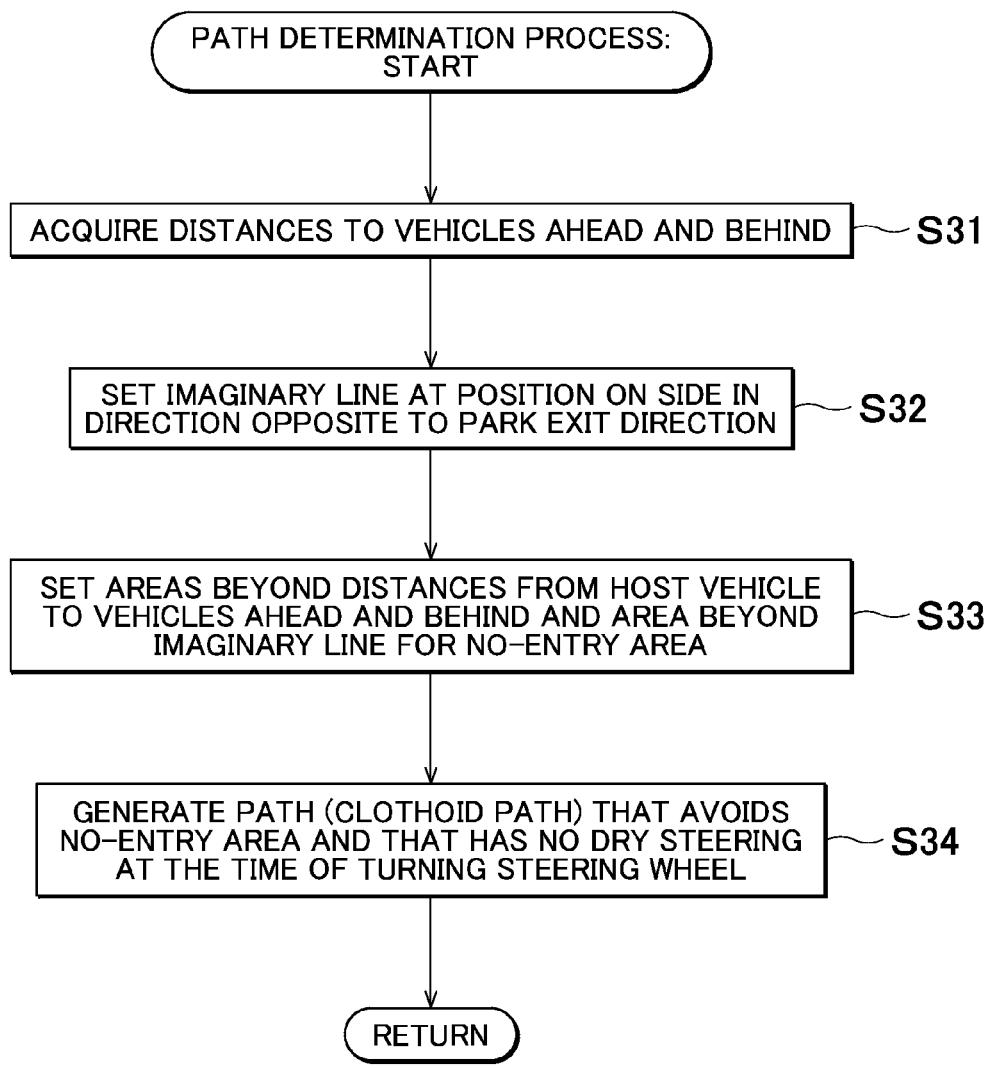
FIG. 8 is a flowchart that shows the procedure of a path determination process according to the embodiment.

In the present embodiment, the moving path RTP is further determined as follows. FIG. 8 is a flowchart that shows the procedure of a path determination process according to the present embodiment.

The ECU 14 functions as the setting unit 148, and acquires distances to vehicles ahead of and behind the vehicle 1 parked at the initial position PS (step S31). The ECU 14 functions as the setting unit 148, and sets an imaginary line VW at a predetermined position on the side of the vehicle 1 in a direction, which is opposite to a park exit direction (the upward arrow in FIG. 7) of the vehicle (step S32), that is, which is opposite to a direction in which the vehicle 1 is moved out of the initial position PS.

The setting unit 148 just needs to set the position of the imaginary line VW at the predetermined position on the side of the vehicle 1 in the direction, which is opposite to the park exit direction, and may set the position of the imaginary line VW at a wheel position at the side in the direction opposite to the park exit direction of the parked vehicle 1 (the position of the left wheels of the vehicle 1 in FIG. 7) or may set the position of the imaginary line VW at a position a predetermined distance (for example, several tens of centimeters, or the like) from the wheel position.

Subsequently, the setting unit 148 sets a forward boundary FW at a position located at a distance from the vehicle 1 to the vehicle ahead and a rearward boundary BW at a position located at a distance from the vehicle 1 to the vehicle behind, and sets an area beyond the forward boundary FW from the vehicle 1, an area beyond the rearward boundary BW from the vehicle 1 and an area beyond the imaginary line from the vehicle 1, for a no-entry area AR (step S33). FIG. 7 shows an example of the no-entry area AR. The area beyond the imaginary line represents an area across the imaginary line from the vehicle 1. The area beyond the boundary represents an area across each boundary from the vehicle 1.

Subsequently, the ECU 14 functions as the moving path determination unit 144, and generates the moving path RTP, along which the vehicle 1 does not enter the no-entry area AR and no dry steering (the steering wheel is turned (rotated) in a vehicle stopped state) is performed at the time of turning (maneuvering) the steering wheel for changing a moving direction of the vehicle between a forward direction and a reverse direction, as a clothoid curve path (clothoid path), and determines the moving path RTP as the moving path from the initial position PS to the park exit target position PT (step S34).

The moving path determination unit 144 determines a path along which the vehicle 1 does not enter the no-entry area; however, at this time, the moving path determination unit 144 sets a path along which not the body end of the vehicle 1 but the wheel position is advanced to the imaginary line VW. That is, the moving control unit 145 executes moving control over the vehicle 1 such that the wheels of the vehicle 1 do not enter the no-entry area AR. Accordingly, it is possible to move the vehicle out of the parking area while further reliably avoiding the obstacle without increasing the equipment of the vehicle.

The setting unit 148 is able to reset the position of the imaginary line VW after setting the no-entry area AR.

For example, at the time of moving the vehicle 1 out of a parking area or at the time of parking the vehicle 1 into a parking area, even when the vehicle 1 moves off the moving path RTP through driver's operation and, as a result, enters the no-entry area AR beyond the imaginary line VW, there is a case where no trouble occurs in moving the vehicle 1 out of the parking area or parking the vehicle 1 into the parking area. In such a case, the setting unit 148 determines that the vehicle 1 is allowed to enter to the position to which the vehicle 1 has entered, resets the imaginary line VW at the position to which the vehicle 1 has entered, and resets the no-entry area AR.

There is a case where the wheels of the vehicle 1 are on the curb 701 or the like, of a road shoulder at the initial position PS (parking position). In this case, after the no-entry area AR is set in the path determination process, the fact that the wheels have dropped from the curb at the time when the vehicle 1 moves in order to exit from a parking area during park exit assist control is detected by an acceleration sensor (not shown), or the like, and the setting unit 148 resets the no-entry area AR by the use of the position at the detected time for the boundary of the imaginary line VW. Thus, the moving path determination unit 144 resets the moving path when there is the switching position or the moving path at a position beyond the reset imaginary line VW.

Therefore, when parking assist is performed to cause the vehicle 1 to run onto the curb 701 at the time of parking, or the like, the moving control unit 145 is configured to park the vehicle 1 on the curb 701 with a margin of the wheel width, thus preventing the wheels from not naturally dropping from the curb 701.

Instead of the acceleration sensor, the setting unit 148, and the like, may be configured to detect a drop of the wheels from a curb in response to a change in wheel speed pulse number that is output from the wheel speed sensor 22.

By allowing the position of the imaginary line VW to be reset after setting the no-entry area AR, it is possible to further reliably and appropriately avoid an obstacle and complete moving the vehicle 1 out of the parking area by flexibly changing the no-entry area AR in response to the situation, or the like, of the vehicle 1.

Referring back to FIG. 6, when the moving path RTP is determined, the ECU 14 proceeds to park exit assist control (step S15).

Figure 9:
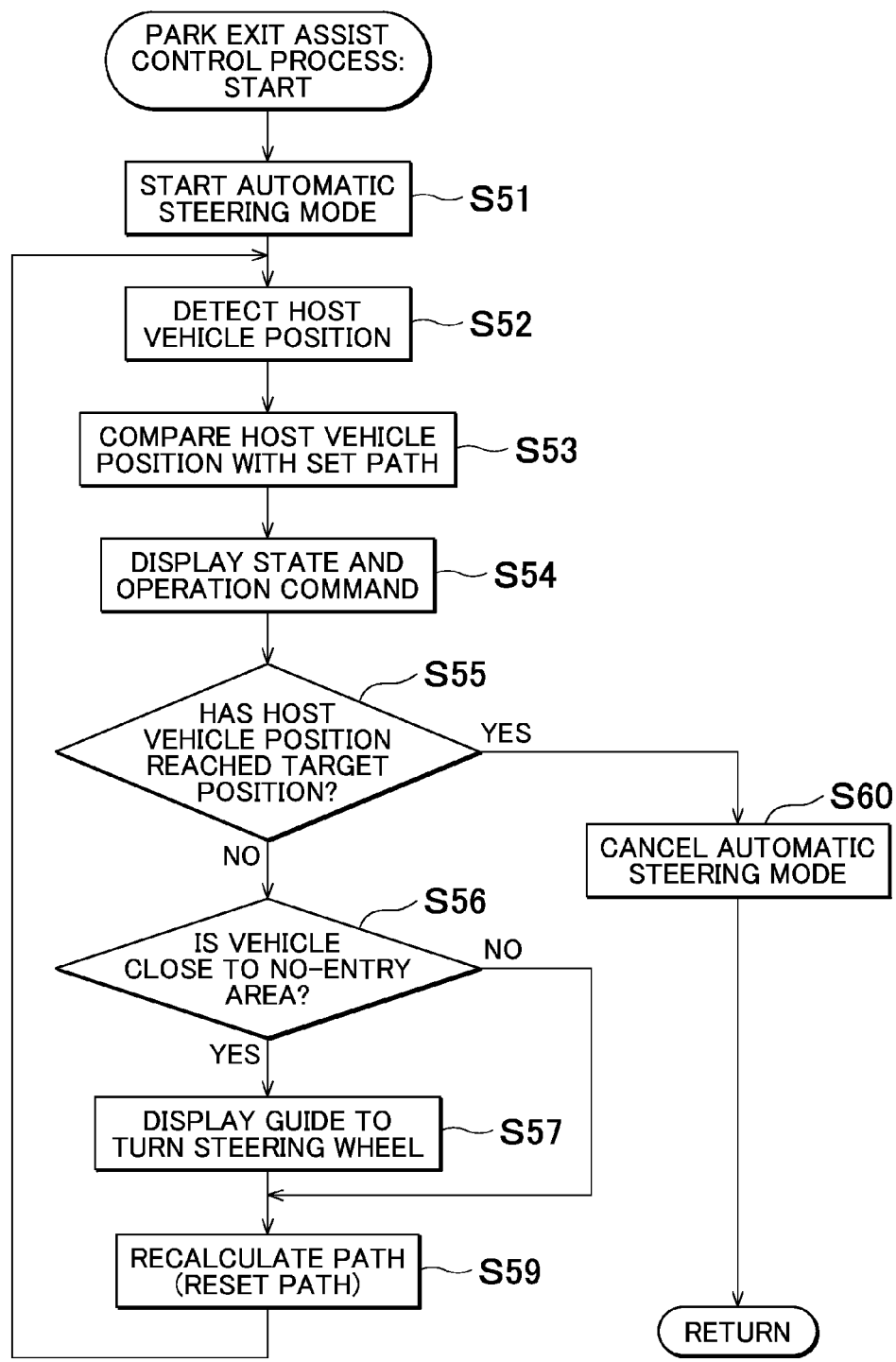
FIG. 9 is a flowchart that shows the procedure of a park exit assist control process according to the embodiment.

FIG. 9 is a processing flowchart of a park exit assist control process. Initially, the ECU 14 functions as the moving control unit 145, and starts an automatic steering mode for performing automatic steering in order to control the portions of the vehicle 1 such that the vehicle 1 moves along the moving path to the park exit target position that is the moving target position (step S51).

In this automatic steering mode, the driver does not need to operate the steering unit 4, specifically, the steering wheel. Creeping in which the driving force of the engine is transmitted without depressing operation of the accelerator pedal, which is an operation of the accelerator operation unit 5, is utilized for the forward driving force and reverse driving force of the vehicle 1 during the parking/exit park assist control process. That is, in the automatic steering mode, the ECU 14 automatically controls operation of the steering unit 4 and transmission of driving force of the vehicle.

Therefore, the driver just operates the brake pedal that serves as the brake operation unit 6 and the shift lever that serves as the shift operation unit 7 in accordance with display on the display device 12.

Subsequently, the moving control unit 145 detects a host vehicle position (step S52). Specifically, the moving control unit 145 (ECU 14) detects the host vehicle position by calculating a distance and a direction, which correspond to a moving amount from the initial position PS, on the basis of the steering amount of the steering unit 4, detected by the steering angle sensor 19, and the vehicle speed detected by the wheel speed sensor 22.

Thus, the ECU 14 compares the set path with the host vehicle position (step S53). The ECU 14, functioning as the output information determination unit 146, determines information about the state of the vehicle and an operation command to the driver and displays the information about the state of the vehicle and the operation command on the display device 12 (step S54).

Figure 10:
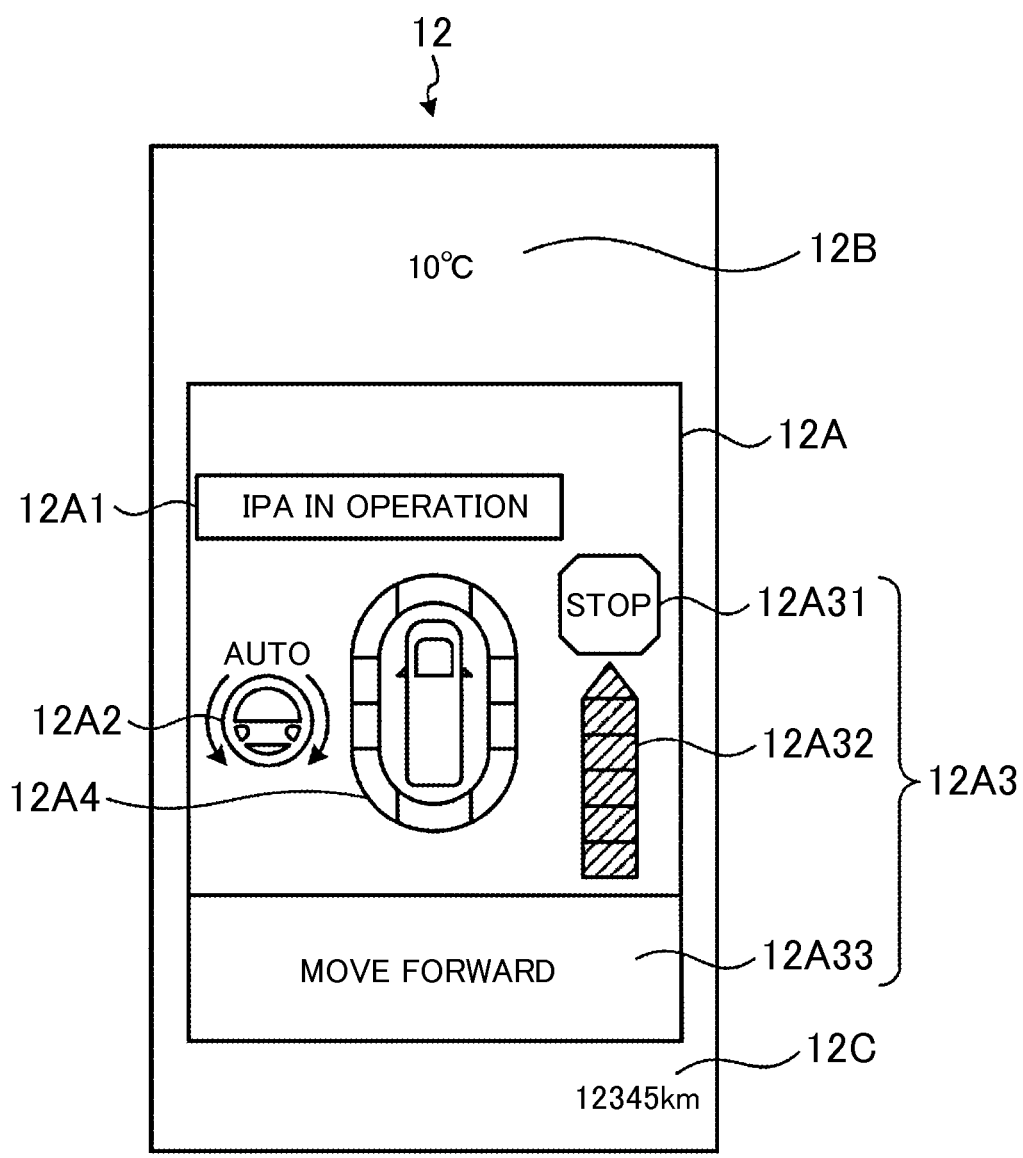
FIG. 10 is a view that illustrates an example of display at the start of the park exit assist control process according to the embodiment.

FIG. 10 is a view that illustrates an example of display at the start of the park exit assist control process. The display screen of the display device 12 roughly includes a parking assist information display region 12A, a selected information display region 12B and a travel distance information display region 12C. The parking assist information display region 12A displays various pieces of information about parking assist and park exit assist. The selected information display region 12B displays various pieces of information selected in advance. The travel distance information display region 12C is able to display information about an odometer or a trip meter.

The parking assist information display region 12A includes a parking assist display region 12A1, an automatic steering symbol display region 12A2, an operation command display region 12A3 and an obstacle display region 12A4. The parking assist display region 12A1 displays that parking assist (intelligent parking assist (IPA)) or park exit assist is in operation when it is actually in operation. In the automatic steering symbol display region 12A2, a symbol that indicates that it is in the automatic steering mode during the automatic steering mode. The operation command display region 12A3 displays an operation command to the driver. The obstacle display region 12A4 displays a direction in which an obstacle is located when it is detected by the distance measuring units 16, 17 that the obstacle is located within a predetermined distance range around the vehicle 1.

In the above configuration, as shown in FIG. 10, a braking operation symbol 12A31, a distance indication symbol 12A32 and a command display region 12A33 are displayed in the operation command display region 12A3. The braking operation symbol 12A31 is set in a lit state at the time when a command to operate the brake pedal that serves as the brake operation unit 6 is issued. The distance indication symbol 12A32 displays a measure of a distance to the switching position of the vehicle 1 at which the steering wheel that serves as the steering unit 4 is turned or a measure of a distance to the moving target position by stepwisely changing from a fully lit state to an unlit state. The command display region 12A33 displays details of a command to the driver.

That is, in the case of FIG. 10, the display device 12 displays that park exit assist is in operation, it is in the automatic steering mode, a distance to the switching position or the park exit target position PT that serves as the moving target position is still left near 100%, and the details of a command to instruct the driver to stop depressing the brake pedal that serves as the brake operation unit 6 and allow the vehicle 1 to move forward by creeping.

When there is a space where the vehicle 1 is allowed to move backward on the basis of a distance from the rear end of the vehicle 1 to the parked vehicle behind, (for example, the distance is 30 cm or above), the moving control unit 145 initially moves the vehicle 1 straight backward. Therefore, the ECU 14 displays the details of a command to change the shift position to R or move backward on the display device 12.

In another example, the moving control unit 145 detects a host vehicle position (step S52), the host vehicle position is compared with the set path (step S53), and, when it is determined that the host vehicle position has reached the switching position P1 or P2, the output information determination unit 146 determines information about the state of the vehicle and an operation command to the driver at the switching position and displays the information and the operation command on the display device 12 (step S54).

Figure 11:
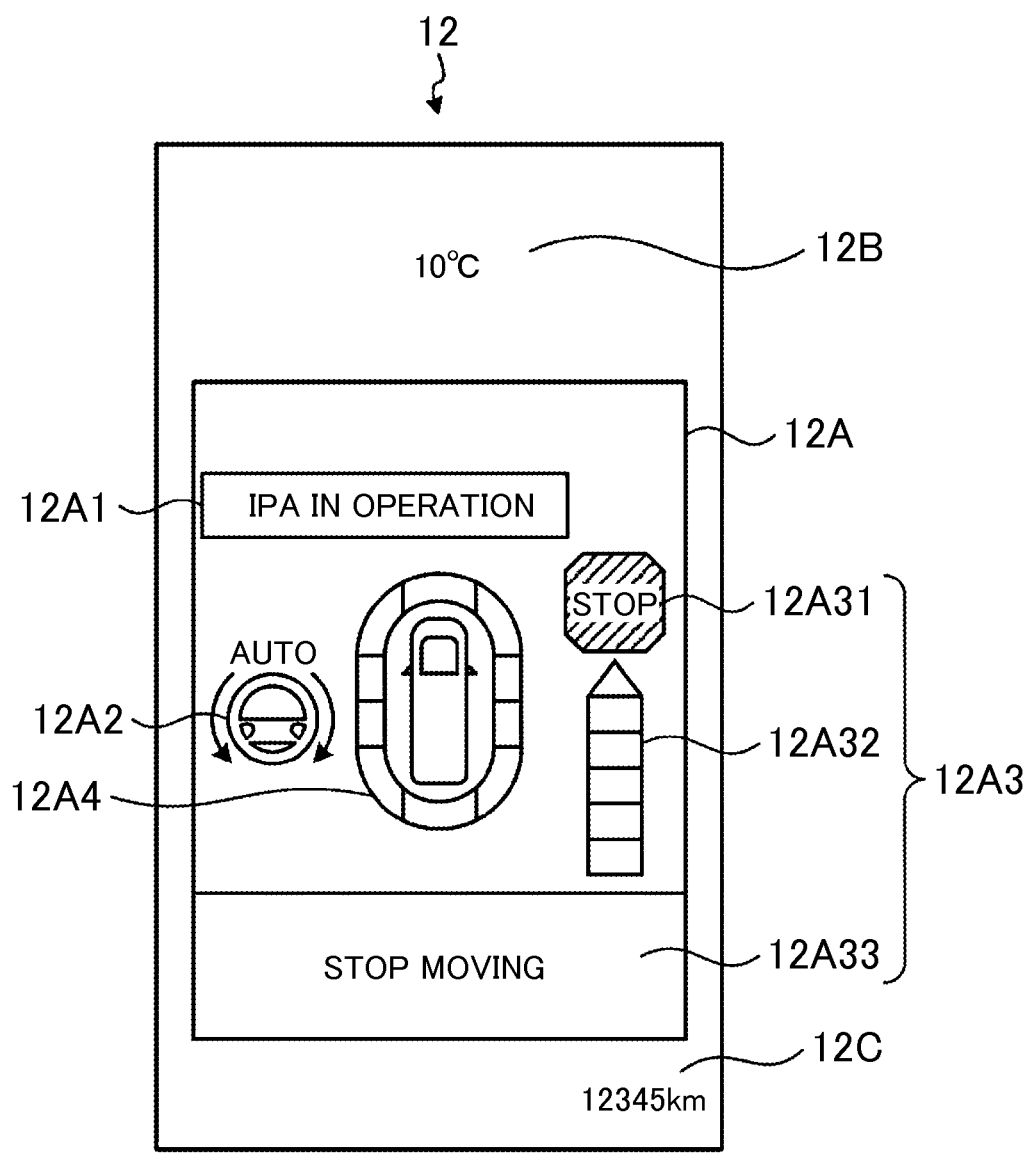
FIG. 11 is a view that illustrates an example of display in the case where a host vehicle position has reached a switching position according to the embodiment.

FIG. 11 is a view that illustrates an example of display in the case where the host vehicle position has reached the switching position. When the host vehicle position has reached the switching position, the ECU 14 sets the braking operation symbol 12A31 in a lit state, displays, for example, "STOP MOVING" in the command display region 12A33, and issues a command to operate the brake pedal that serves as the brake operation unit 6 to the driver.

Subsequently, the ECU 14 functions as the moving control unit 145, and determines whether the host vehicle position has reached the park exit target position PT that serves as the target position (step S55).

When the host vehicle position has not reached the park exit target position PT that serves as the target position yet (No in step S55), the moving control unit 145 determines on the basis of the host vehicle position of the vehicle 1 whether the vehicle 1 is close to the no-entry area (step S56). Specifically, the moving control unit 145 determines whether the distance between the wheels of the vehicle 1 and the no-entry area (the boundaries and imaginary line of the no-entry area) is shorter than a predetermined first distance and the vehicle 1 is close to the no-entry area.

When the distance between the wheels of the vehicle 1 and the no-entry area becomes shorter than the predetermined first distance and the vehicle 1 is close to the no-entry area (Yes in step S56), the ECU 14 displays a guide to turn the steering wheel for changing the moving direction of the vehicle between the forward direction and the reverse direction (step S57). The guide to turn the steering wheel may be determined arbitrarily, and, for example, the above-described display screen shown in FIG. 11 may be displayed as the guide to turn the steering wheel.

On the other hand, when the distance between the wheels of the vehicle 1 and the no-entry area is longer than or equal to the predetermined first distance and the vehicle 1 is not close to the no-entry area (No in step S56), the guide to turn the steering wheel is not displayed in step S57.

Subsequently, the ECU 14 functions as the moving path determination unit 144 again, recalculates a moving path, and resets a moving path (step S59). This is because the vehicle 1 does not always travel along a set moving path depending on a road surface condition, or the like, and, therefore, an optimal moving path is kept commensurately with an actual condition.

The ECU 14 proceeds to step S52 again, and repeats a similar process thereafter.

Figure 12:
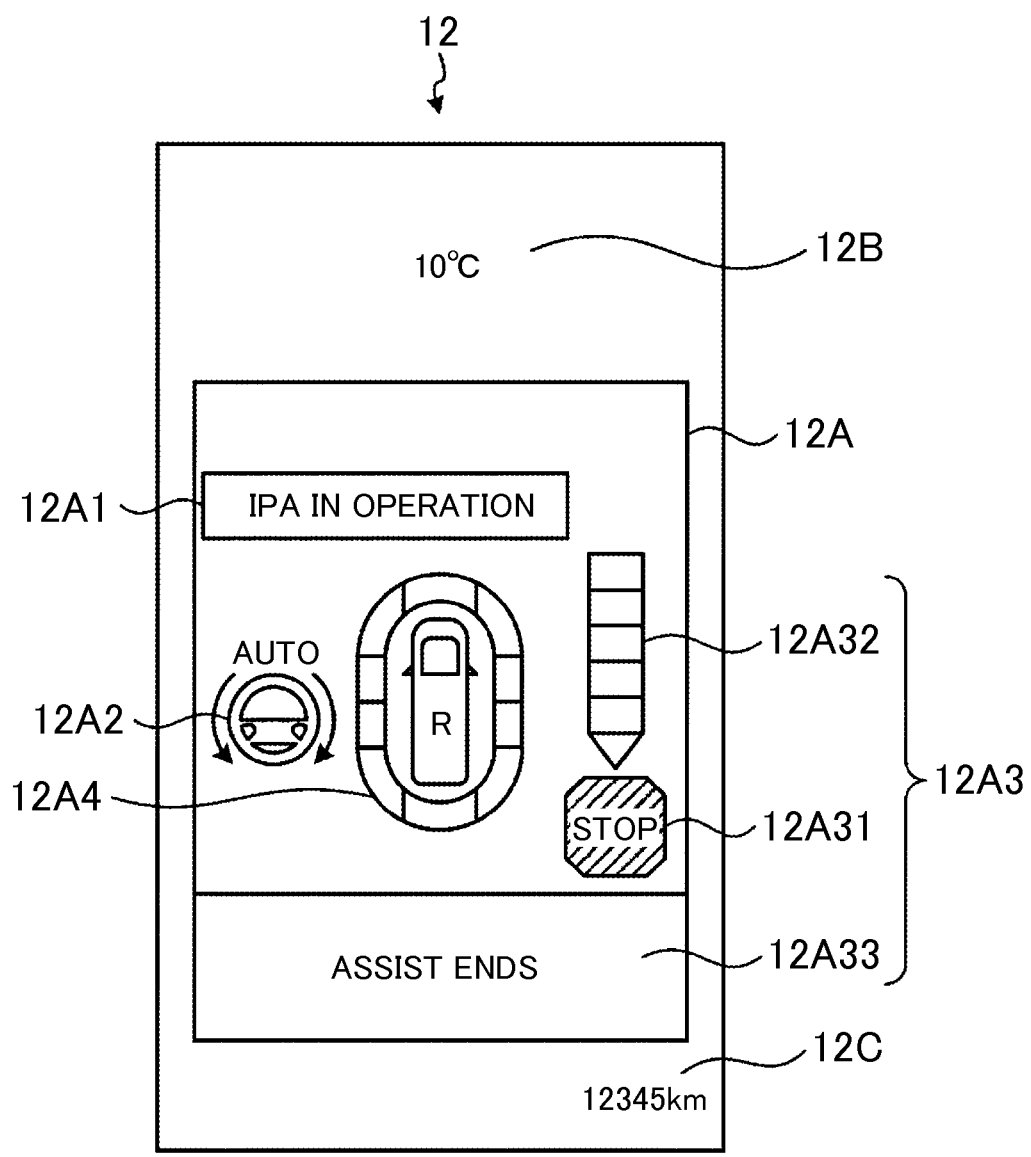
FIG. 12 is a view that illustrates an example of display at the end of park exit assist according to the embodiment.

When it is determined in step S55 that the host vehicle position has reached the park exit target position PT that serves as the target position (Yes in step S55), the moving control unit 145 cancels the automatic steering mode (step S60), and the ECU 14 displays the end of the park exit assist process in the command display region 12A33 and ends the park exit assist process. FIG. 12 is a view that illustrates an example of display at the end of park exit assist.

In this way, in the present embodiment, at the time of assisting in moving the vehicle 1 parallel parked in the available parking area 201 out of the available parking area 201, an imaginary line is set at the predetermined position on the side of the vehicle 1 at the start of park exit assist, forward and rearward boundaries are set at the positions of parked vehicles ahead of and behind the vehicle 1, an area beyond the imaginary line and areas beyond the forward and rearward boundaries that are the positions of the parked vehicles ahead of and behind the vehicle 1 are set for a no-entry area, and park exit assist control is executed over the vehicle 1 such that the vehicle 1 does not enter the no-entry area. In the present embodiment, when the vehicle 1 moving out of the parking area is close to the no-entry area AR at a distance shorter than the first distance, a guide to turn (maneuver) the steering wheel is displayed on the display device 12. Therefore, according to the present embodiment, when park exit assist is performed, it is possible to move the vehicle out of the parking area while reliably avoiding an obstacle without increasing the equipment of the vehicle. Thus, according to the present embodiment, even when there is a curb, a ditch, or the like, in a park exit direction, it is possible to complete moving the vehicle out of the parking area while preventing damage of the wheels due to collision, running off into a ditch, or the like.

The embodiment of the invention is described above; however, the embodiment is only illustrative and not intended to limit the scope of the invention. This novel embodiment may be implemented in other various forms, and may be variously omitted, replaced or changed without departing from the spirit of the invention. The scope and spirit of the invention encompass the embodiment and its modifications, and the invention described in the appended claims and equivalents thereof encompass the embodiment and its modifications.

For example, in the present embodiment, the imaginary line VW is set. Instead, the setting unit 148 may be configured to set imaginary walls extending the imaginary line VW and the forward and rearward boundaries FW, BW vertically upward with respect to the ground surface, and set areas beyond the imaginary walls for a no-entry area AR. In this case, the moving control unit 145 further executes control such that the vehicle body (body end) of the vehicle 1 does not enter the no-entry area AR. For example, the moving control unit 145 just needs to be configured to display a guide to turn (maneuver) the steering wheel on the display device 12 when a distance between the vehicle body (body end) of the vehicle 1 and the imaginary walls becomes shorter than a predetermined first distance and the vehicle 1 is close to the no-entry area AR. Thus, it is possible to move the vehicle 1 out of the parking area while further reliably avoiding an obstacle without increasing the equipment of the vehicle. In the present embodiment, the no-entry area AR is set by the imaginary line VW and the forward and rearward boundaries FW, BW; however, setting of a no-entry area AR is not limited to this configuration. For example, a region beyond the imaginary line VW may be set for a no-entry area AR. Similarly, the setting unit 148 may be configured to set an imaginary wall extending the imaginary line VW vertically upward with respect to the ground surface, and set an area beyond the imaginary wall for a no-entry area AR.

What is claimed is:

1. A park exit assist system comprising
an electronic control unit configured to:
at a time of assisting in moving a vehicle parallel parked in a parking area out of the parking area, set an imaginary line at a boundary at a predetermined position on a side in a direction, which is opposite to a direction in which the vehicle is moved out of the parking area, on the basis of a position of the vehicle at a start of assisting in moving the vehicle out of the parking area;
set an area beyond the imaginary line for a no-entry area; and execute control for assisting in moving the vehicle out of the parking area such that the vehicle does not enter the no-entry area, wherein the electronic control unit is configured to set an imaginary wall extending the imaginary line vertically with respect to a ground surface, the electronic control unit is configured to set an area beyond the imaginary wall for the no-entry area, and the electronic control unit is configured to execute control such that a vehicle body of the vehicle does not enter the no-entry area.

2. The park exit assist system according to claim 1, wherein the electronic control unit is configured to set the imaginary line, a forward boundary at a position of a parked vehicle ahead of the vehicle, and a rearward boundary at a position of a parked vehicle behind the vehicle, and the electronic control unit is configured to set the area beyond the imaginary line, an area beyond the forward boundary and an area beyond the rearward boundary, for the no-entry area.

3. The park exit assist system according to claim 2, wherein the electronic control unit is configured to, when the vehicle moving out of the parking area is close to the no-entry area at a distance shorter than a first distance, provide a guide to turn a steering unit.

4. The park exit assist system according to claim 3, wherein the electronic control unit is further configured to reset the position of the imaginary line.

5. The park exit assist system according to claim 2, wherein the electronic control unit is further configured to reset the position of the imaginary line.

6. The park exit assist system according to claim 1, wherein the electronic control unit is configured to, when the vehicle moving out of the parking area is close to the no-entry area at a distance shorter than a first distance, provide a guide to turn a steering unit.

7. The park exit assist system according to claim 6, wherein the electronic control unit is further configured to reset the position of the imaginary line.

8. The park exit assist system according to claim 1, wherein the electronic control unit is further configured to reset the position of the imaginary line.

9. The park exit assist system according to claim 1, wherein the electronic control unit is configured to execute control such that a wheel of the vehicle does not enter the no-entry area.

10. The park exit assist system according to claim 1, wherein the electronic control unit is configured to, at the time of assisting in moving the vehicle out of the parking area, control the vehicle in an automatic steering mode.

11. A park exit assist method, implemented by an electronic control unit, comprising:

at a time of assisting in moving a vehicle parallel parked in a parking area out of the parking area, setting an imaginary line at a boundary at a predetermined position on a side in a direction, which is opposite to a direction in which the vehicle is moved out of the parking area, on the basis of a position of the vehicle at a start of assisting in moving the vehicle out of the parking area;

setting an area beyond the imaginary line for a no-entry area; and executing control for assisting in moving the vehicle out of the parking area such that the vehicle does not enter the no-entry area, further comprising:

setting an imaginary wall extending the imaginary line vertically with respect to a ground surface;

setting an area beyond the imaginary wall for the no-entry area; and executing control such that a vehicle body of the vehicle does not enter the no-entry area.

12. The park exit assist method according to claim 11, further comprising:

setting the imaginary line, a forward boundary at a position of a parked vehicle ahead of the vehicle, and a rearward boundary at a position of a parked vehicle behind the vehicle; and setting the area beyond the imaginary line, an area beyond the forward boundary and an area beyond the rearward boundary, for the no-entry area.

13. The park exit assist method according to claim 12, further comprising, when the vehicle moving out of the parking area is close to the no-entry area at a distance shorter than a first distance, providing a guide to turn a steering unit.

14. The park exit assist method according to claim 13, further comprising resetting the position of the imaginary line.

15. The park exit assist method according to claim 12, further comprising resetting the position of the imaginary line.

16. The park exit assist method according to claim 11, further comprising, when the vehicle moving out of the parking area is close to the no-entry area at a distance shorter than a first distance, providing a guide to turn a steering unit.

17. The park exit assist method according to claim 16, further comprising resetting the position of the imaginary line.

18. The park exit assist method according to claim 11, further comprising resetting the position of the imaginary line.

19. The park exit assist method according to claim 11, further comprising executing control such that a wheel of the vehicle does not enter the no-entry area.

* * * * *